(12) United States Patent
Nolfi et al.

(10) Patent No.: US 11,867,336 B2
(45) Date of Patent: Jan. 9, 2024

(54) FLEXIBLE, FOLDABLE FOREIGN MATERIAL EXCLUSION DEVICE

(71) Applicant: ADVANCED F.M.E. PRODUCTS, INC., Mentor, OH (US)

(72) Inventors: Thomas J. Nolfi, Chardon, OH (US); Chase Penix, Painesville, OH (US)

(73) Assignee: ADVANCED F.M.E. PRODUCTS, INC., Mentor, OH (US)

(*) Notice: Subject to any disclaimer, the term of this patent is extended or adjusted under 35 U.S.C. 154(b) by 13 days.

(21) Appl. No.: 17/503,801

(22) Filed: Oct. 18, 2021

(65) Prior Publication Data

US 2022/0128183 A1 Apr. 28, 2022

Related U.S. Application Data

(60) Provisional application No. 63/104,911, filed on Oct. 23, 2020.

(51) Int. Cl.
*F16L 55/10* (2006.01)
*F16L 55/11* (2006.01)
(Continued)

(52) U.S. Cl.
CPC ......... *F16L 55/1018* (2013.01); *F16L 55/115* (2013.01); *F16L 55/1141* (2013.01); *F16L 55/1283* (2013.01)

(58) Field of Classification Search
CPC .... B64F 1/005; E03F 7/02; F16J 13/14; F16L 55/1018; F16L 55/1141; F16L 55/132; F16L 2201/80
(Continued)

(56) References Cited

U.S. PATENT DOCUMENTS 3,319,273 A * 5/1967 Solin ........................ A63B 6/00
473/29
4,290,569 A * 9/1981 McIntyre ................ B64F 1/005
244/129.4
(Continued)

OTHER PUBLICATIONS

"Aviation". Web Page [Online]. King Bag and Manufacturing Company. [retrieved on Jan. 5, 2023]. Retrieved from the Internet Archive Wayback Machine: <URL: https://web.archive.org/web/20190111042902/http://kingbag.com/aviation/nggallery/page/1> (Year: 2019).*
(Continued)

*Primary Examiner* — Craig M Schneider
*Assistant Examiner* — David R Deal
(74) *Attorney, Agent, or Firm* — Hudak, Shunk & Farine Co. LPA

(57) ABSTRACT

A foreign material exclusion device that is adapted to seal an area of a construction, such as a tube or pipe or other cavity, from foreign material or debris temporarily, wherein the device includes a cylindrical plug that has a plurality of resilient bodies for holding the device within a particular construction. The bodies are substantially planar, and semi-cylindrical in shape wherein two bodies are utilized. A flexible cover includes a first pouch which contains a first body therein and desirably a second pouch of the cover contains a second body therein, with the cover having a hinge between said first and second pouches. When the device is not in use, the bodies can be folded against one another in a closed position until they are inserted into a tube or pipe whereupon they can be opened to an open position and generally form a disk having a snug, fitted connection with a wall of the tube or pipe.

16 Claims, 2 Drawing Sheets

(51) Int. Cl.
*F16L 55/128* (2006.01)
*F16L 55/115* (2006.01)

(58) Field of Classification Search
USPC .................. 126/319; 220/305, 902, DIG. 19; D12/345
See application file for complete search history.

(56) References Cited

U.S. PATENT DOCUMENTS

| | | | |
|---|---|---|---|
| 4,615,460 A * | 10/1986 | Buccellato | B64F 5/30 220/DIG. 19 |
| 5,143,321 A * | 9/1992 | Jackson | B64F 1/005 60/39.092 |
| 6,506,014 B1 | 1/2003 | Nolfi et al. | |
| 6,824,356 B2 | 11/2004 | Nolfi et al. | |
| 7,533,698 B2 | 5/2009 | Nolfi et al. | |
| 8,967,203 B2 | 3/2015 | Nolfi et al. | |
| 9,133,727 B2 | 9/2015 | Nolfi et al. | |
| 9,476,534 B2 | 10/2016 | Nolfi et al. | |
| 9,932,122 B2 * | 4/2018 | Loureiro | B64D 33/04 |
| 9,938,859 B2 | 4/2018 | Nolfi et al. | |
| 10,436,111 B2 | 10/2019 | Nolfi et al. | |
| 2020/0232591 A1 | 7/2020 | Nolfi et al. | |

OTHER PUBLICATIONS

"Boeing 737, all models & variants". Product Catalog [Online]. Bruce's Custom Covers. [retrieved on Jan. 5, 2023]. Retrieved from the Internet Archive Wayback Machine: <URL: https://web.archive.org/web/20200920033749/https://www.aircraftcovers.com/B737> (Year: 2020).*

"Aircraft Cowl Plugs". Product Catalog [Online]. Seating Connection. [retrieved on Jan. 5, 2023]. Retrieved from the Internet Archive Wayback Machine: <URL: https://web.archive.org/web/20200927231223/https://www.seatingconnection.com/aircraft-cowl-plugs/> (Year: 2020).*

* cited by examiner

FLEXIBLE, FOLDABLE FOREIGN MATERIAL EXCLUSION DEVICE

FIELD OF THE INVENTION

The present invention relates to a foreign material exclusion device that is adapted to seal an area of a construction, such as a tube or pipe or other cavity, from foreign material or debris temporarily, wherein the device includes a cylindrical plug that has a plurality of resilient bodies for holding the device within a particular construction. The bodies are substantially planar, and semicylindrical in shape wherein two bodies are utilized. A flexible cover includes a first pouch which contains a first body therein and desirably a second pouch of the cover contains a second body therein, with the cover having a hinge between said first and second pouches. When the device is not in use, the bodies can be folded against one another in a closed position until they are inserted into a tube or pipe whereupon they can be opened to an open position and generally form a disk having a snug, fitted connection with a wall of the tube or pipe. Accordingly, the tube, pipe, or cavity is blocked and retains foreign material and/or debris therein that can be removed before the tube or pipe is placed in operation for its intended purpose such as flowing a fluid therethrough, a heated gas such as steam, and the like. A handle is generally attached to each pouch and/or body so the device can be opened or closed as well as to permit removal of the device from the tube or pipe.

BACKGROUND OF THE INVENTION

During assembly or maintenance of various assemblies or constructions in numerous industries, it is desirable to prevent the introduction of debris into one or more areas to prevent damage to various objects. Foreign material exclusion is of particular concern in the field of power generation and supply, whether nuclear, hydro or fossil fueled in order to prevent or reduce power shortages and outages, as well as to increase nuclear safety.

While undergoing maintenance or assembly, small parts, screws, bolts, or other foreign objects can fall into crevices. If not prevented, retrieved or noticed, such parts can have the potential to destroy or at least damage a particular unit and produce varying consequences, potentially catastrophic.

In order to provide foreign material exclusion, various devices have been proposed, see for example U.S. Pat. Nos. 6,506,014, 6,824,356, 7,533,698, 8,967,203, 9,133,727, 9,938,859, 9,476,534, and 10,436,111, as well as U.S. Publication No. 2020/0232591.

SUMMARY OF THE INVENTION

Even though the above-identified art provides useful, alternative solutions for foreign material exclusion, the art still needs a secure, and a readily insertable and expandable, flexible and foldable foreign material exclusion device.

The foreign material exclusion devices disclosed herein serves the needs described above, as well as others, as apparent from the description set forth herein. The device is adapted to be positioned within a tube, pipe or other cavity to temporarily seal off one side from another to prevent construction debris from entering a sensitive side of the tube, pipe or cavity. The device comprises multiple resilient bodies located within a flexible cover that can be fitted into the tube or pipe in a semi-compressed state and, upon positioning thereof, expanded to form a snug perimeter fit with the tube, pipe or cavity.

In one embodiment, the flexible, foldable foreign material exclusion device comprises a cylindrical plug including a first body hingedly connected to a second body such that in an open position the plug forms a cylinder and in a non-open position does not form the cylinder.

In view of the description herein, it should be understood that the term "open position" refers to the device when it is generally in the shape of a disk or cylinder in which state the device, when fitted in a tube or pipe, seals off one side of the device from the other side. A "non-opened position" or "closed position" refers to the device in a state in which the device does not form a disk or cylinder, such as when a first body of the device is positioned at a non-planar angle with respect to a second body of the device. As a specific example, the open position is illustrated in FIG. 1C and non-opened positions are illustrated in FIGS. 1A and 1B.

In a further embodiment, the one or more bodies are enclosed and sealed within a cover, with each body preferably being located within an individual pouch. Each pouch preferably conforms to the shape of a respective body. The cover also includes a hinge that connects the first pouch to the second pouch, with the hinge being a joint that allows one pouch to be adjustably positioned or rotated in relation to another pouch and respective bodies therein.

In a further embodiment a handle is connected to one or more of the first pouch and the second pouch that can be used to adjust the positioning between the pouches present and bodies located therein with respect to each other.

In one aspect a flexible, foldable foreign material exclusion device is disclosed, comprising a first body comprising a resilient material, wherein the first body has a first planar surface, a second planar surface and a first sidewall therebetween, wherein the first body is compressible and re-expandable in a direction parallel to at least one of the first planar surface and the second planar surface; a second body comprising a resilient material wherein the second body has a second planar surface, a first planar surface and a second sidewall therebetween, wherein the second body is compressible and re-expandable in a direction parallel to at least one of the first planar surface and the second planar surface; a cover comprising first pouch that encloses the first body, a second pouch that encloses the second body, and a hinge connecting the first pouch to the second pouch, wherein the hinge is a joint that allows the first pouch to be rotated in relation to the second pouch between a closed position and an open position wherein the first planar surface of the first body is parallel to the first planar surface of the second body; and a handle connected to one or more of the first pouch and the second pouch that can be used to manipulate the device.

In a further aspect a flexible, foldable foreign material exclusion device is disclosed, comprising a foldable cylindrical plug including a first body hingedly connected to a second body such that in an open position the plug forms a cylinder and in a non-open position does not form the cylinder, wherein the hinge allows the first body to be rotated in relation to the second body, wherein the first body and the second body each comprise a resilient material that is compressible and recompressible in a direction perpendicular to a height of the cylinder; and wherein a handle is connected to the plug that can be used to manipulate the plug between the open position and the non-open position.

For the avoidance of doubt, it is understood that while various embodiments of the invention are described individually, it should be clear that two or more embodiments can, and often times are present in a single device according to the present invention.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1A:
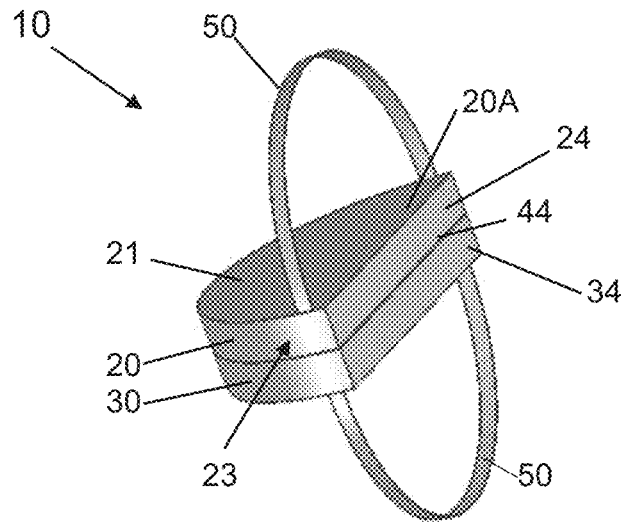
FIG. 1A is a perspective view of the foreign material exclusion device of the present invention in a first non-open position.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "Inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris, rubbish, and the like. As an example, it is desirable to protect a construction such as a turbine and a power plant from debris as the turbine can be catastrophically damaged by unwanted parts, or metal shavings. The foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Foreign materials can generally be defined as any object, particle or the like such as, but not limited to, nuts, bolts, metal bits, debris, hand tools, sockets, measuring devices, or any other material not designed to be located in a desired area of an apparatus, machine, article, that contains tubes or pipes such as a turbine assembly. Dimensions can vary widely by application, with the primary goal of foreign material exclusion device requiring sufficient strength to retain the heaviest object used in that portion of the protected device.

Referring now to the drawings, wherein like parts r components are represented by like or identical reference numbers throughout the several views, a flexible, foldable foreign material exclusion device 10 is shown containing a body 20 adjacent and operatively connected to another body 30. The shape of the various bodies are designed so that once the device is compressed and inserted into a tube, pipe, or other cavity the body is allowed to expand and fully contact the inner perimeter wall thereof and keep foreign material from traveling from one side of the device to the other. As described herein, the bodies 20, 30 are located within cover 40. For the sake of clarity it is to be understood that the reference numbers 20, 21, 22, 23, 24, 30, 31, 32, 33 and 34 refer to the bodies 20 and 30 and parts thereof, which are located beneath cover 40.

Figure 1B:
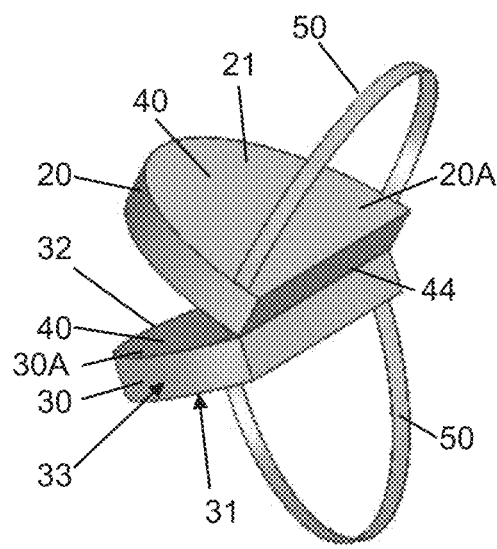
FIG. 1B is a perspective view of the foreign material exclusion device of the present invention in a second non-open position.
Figure 1C:
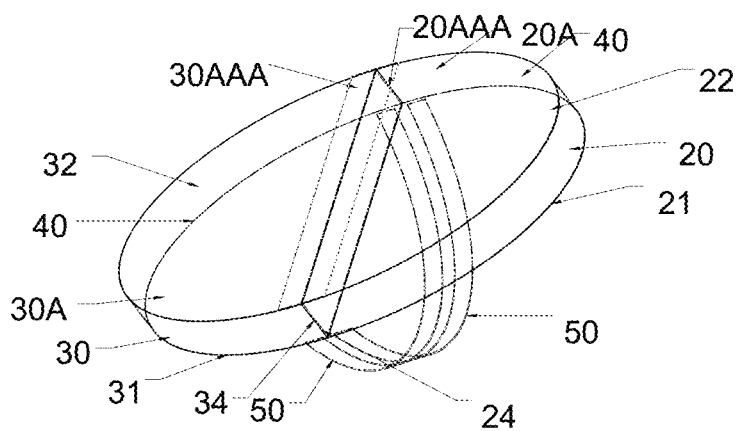
FIG. 1C is a perspective view of the foreign material exclusion device of the present invention in an open position.

Body 20 has a first planar surface 21, a second planar surface 22 and a first sidewall 23 located therebetween as illustrated in FIG. 1A through FIG. 1C. The body 20 is at least compressible and re-expandable in a direction parallel to the plane of at least one of the first surface and a second surface to facilitate placement within a pipe, tube or other cavity. Similarly, body 30 also has a first planar surface 31, a second planar surface 32 and a first sidewall 33 therebetween.

Sidewall 23 has a hinge sidewall 24 that abuts a second hinge sidewall 34 of second body 30 when the device is in the open, in-use position illustrated in FIG. 1C. First hinge sidewall 24 and second hinge sidewall 34 are coplanar when the device is in the open position.

In a preferred embodiment, the first planar surface 21, 31 of the body 20, 30 has a plane that is parallel to a plane of the second planar surface 22, 32 of the body. Having a planar surface enables the user of the device to readily identify any debris on a surface of the device which can be extracted prior to removal of the device from a tube, pipe or other cavity. However, it is to be noted that in some embodiments it may be desirable to utilize bodies having end surfaces that are not planar.

In a preferred embodiment, in order to provide a foreign material exclusion device in the form of a disk or cylindrical plug, the body sidewall, for example 23 and 33, that is not part of the hinge sidewall 24, 34 is in the shape of a semi-circle or other segment of a circle if more than two bodies are utilized. The bodies 20 and 30 shown in FIG. 1A through FIG. 1C are semicylindrical in shape.

In a preferred embodiment, the device 10 includes semi-cylindrical bodies 20 and 30 having a thickness thereof, i.e., depth between non-sidewall surfaces, that is sufficient to maintain and hold the entire exclusion device 10 in place within the tube or pipe without being detached therefrom. Accordingly, the thickness of each individual resilient body, independently, can range from about 2 to about 12 inches and desirably from about 4 to about 8 Inches. Also, the diameter of the outer dimensions, such as when the device is cylindrical, of the entire exclusion device 10 containing resilient bodies 20 and 30 therein is slightly larger than the internal dimensions or diameter of the tube or pipe so that it fits snuggly therein and is not moved or loosened from the internal area of the tube or pipe by the foreign material such as when the same falls into the tube or pipe.

Optionally, the actual size dimensions of the bodies 20 and 30 that together generally form a disk or cylinder can be of other specific geometric or other random shapes such as a cube, block, figure "8", or oval but are still custom-tailored, that is has a similar or preferably identical profile to provide a resilient, snug fit within the above-noted tube, pipe, or other shaped construction, and thereby provide a barrier to the entrance of any foreign materials. A slightly larger resilient or snug fit is assured by making the dimensions or diameter of the two or more bodies when connected, mated, or in an open position as shown in FIG. 1C from about 1 percent to about 40, and desirably from about 3 to about 25 percent larger than the tube or pipe internal diameter or other internal dimension when the construction is non-cylindrical.

The resilient bodies 20 and 30 of the foreign material exclusion device 10 of the present invention, independently, are generally formed from a polymer, elastomer or rubber, and are preferably a foam or foam-like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the tube or pipe. Generally, open cell foams are preferred as they prevent foreign material from passing therethrough but yet are more flexible and elastomeric when compared to closed cell foams which tend to be compression resistant.

Suitable polymer and elastomer compositions which can be foamed to form the body of the present invention include polyethylene, e.g. low density polyethylene (LDPE) and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid, or methyl acrylic acid and $C_1$-$C_4$ alkyl esters, or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which can be used in the practice of the invention include, but are not limited to, polyesters, polyamides, polyvinylchloride, polyvinylidene chloride, polycarbonates, polyurethanes, and polystyrene resins.

Rubbers include silicones and copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include aromatic containing rubbers such as styrene-butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

As noted above, the polymer or rubber foam may be open or closed-celled. The percentage of open cells can be controlled, as is well known in the art, by appropriate selection of blowing agents, additives, polymers, and processing parameters, such as temperatures, pressures, and extrusion rates. A preferred foam of the present invention is polyester and is available from sources including Orbis Manufacturing of Mentor, Ohio.

While the density of the foam can vary, the foams of the present invention are generally considered lightweight and range generally from about 1 to about 200 or 300 $kg/m^3$, desirably from about 5 to about 150 $kg/m^3$, and preferably from about 10 to 20 to about 50, about 75, or about 100 $kg/m^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, and thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; and fluorochlorinated hydrocarbons such as dichlorotetrafluoroethane, trifluoroethane, trichloromonofluoromethane, dichlorodifluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also, decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Optionally, but preferably, a flame retardant, resistant, or quenching coating is applied to any of the foreign material exclusion devices described in this application, preferably on at least the body thereof. That is, the flame retardant coating can be applied directly to the resilient body material 20 or 30, or to flexible cover 40 that resides on bodies 20 and 30. In another embodiment, the flame retardant can resides on both the resilient body material as well as the flexible cover material. The flame retardant coating, not shown, can be directly applied to one or more surfaces such as an upper, i.e. handle side, or lower side, of the body, and especially to the portion thereof that can be exposed to high temperature debris, chips, filings, etc., such as from a welding process on the construction. The coating is also heat resistant. The coating is any suitable thickness to provide the desired flame or heat resistant properties. In one embodiment, the coating is on top of or in surface contact with at least a portion of the device, and in a second embodiment, saturates a portion of the body of the device in addition to being present on a surface. The coating on the foreign material exclusion device has a sufficient thickness to achieve the desired goal of providing flame retardant, flame resistant, or the like properties. Coating thickness may vary from surface to surface and vary on a single surface, and ranges generally from about 0.010 to about 0.25 inches, desirably from about 0.020 to about 0.20 inches, and preferably from 0.05 to about 0.15 inches.

Such coatings are well known in the art and are generally latexes such as HCF from PDI, Inc. of Circle Pines, Minn.

The flame retardant coating is applied to at least one surface of a foreign material exclusion device of the invention utilizing one or more methods, including but not limited to, spray coating, roll coating, screen printing, bonding, adhesive, double sided tape or the like.

The resilient bodies 20 and 30 that are generally of a flat, semicylindrical shape desirably are provided with a cover 40 that encloses the bodies therein. Flexible cover 40 is a durable material that can be man-made, i.e. synthetic, or a natural material, or a combination thereof. Cover 40 generally is a synthetic fabric that can be woven or a natural fabric or cloth that serves to receive, contain, hold, and the like either (first) body 20 or (second) body 30, or preferably both. That is, cover 40 is tailored to cover both bodies 20 and 30.

The cover 40 includes pouches or pockets, wherein the first pouch 20A is designed to essentially enclose, fit over, contain hold non-compressed resilient body 20 and second pouch 30A is designed to enclose, fit over, contain, or hold non-compressed resilient body 30. Both pouches are designed to enclose, hold, contain, etc., bodies 20 and 30 in a non-compressed state. Cover 40 includes at least one hinge 44 that allows the bodies to be manipulated between an open position, see FIG. 1C and a non-open position, see for example FIG. 1A and FIG. 1B. Hinge 44 is a joint that allows the first pouch to be rotated in relation to the second pouch between a non-open position and the open position wherein the first planar surface of the first body is parallel to the first planar surface of the second body.

Figure 2:
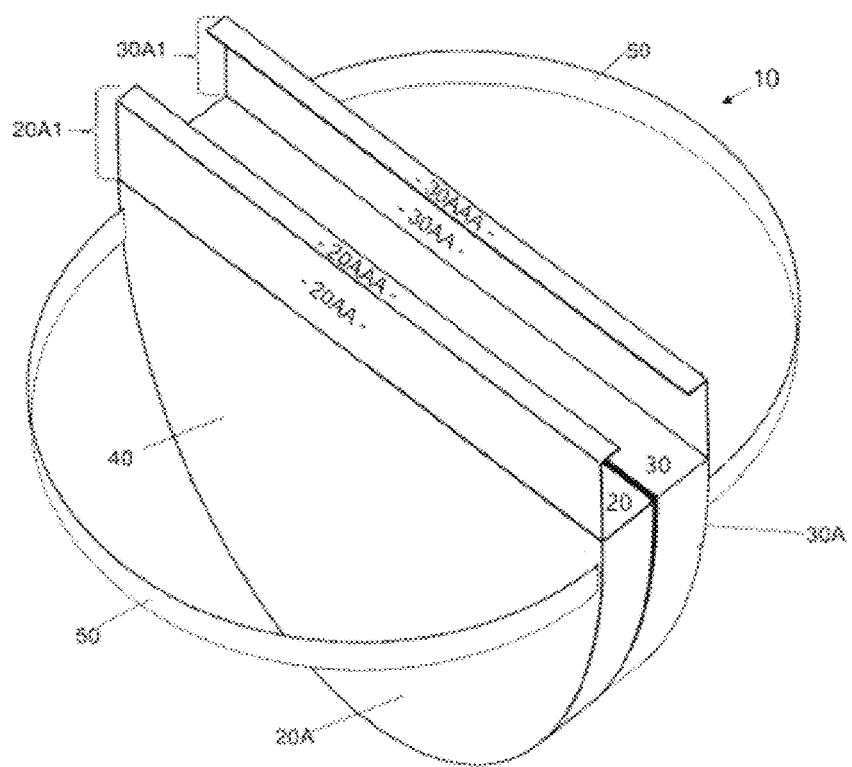
FIG. 2 is a perspective view of a foreign material exclusion device of the present invention showing the cover with pouches that contain a body therein.

Hinge 44 allows the bodies to be folded upon ne another as shown in FIG. 1A, and FIG. 2, such that the first planar surface of the first body contacts the first planar surface of the second body. In one embodiment, as best shown in FIG. 2, the inside end of pouch 20A of body 20 has pouch portion 20A1 that extends beyond the base of the body and has a flange 20AA that extends along the entire baseline of body 20. Flange 20AA has a tab 20AAA thereon. Similarly, as best shown in FIG. 2, the inside end of pouch 30A of body 30 has pouch portion 30A1 that extends beyond the based base of the body, and has flange 30AA thereon that extends along the entire base of body 30. Flange 30AA has tab 30AAA located thereon. Inherently, flange 20AA and tab 20AAA as well as flange 30AA and tab 30AAA can be tucked into the pouch so as to cover the base of each body in a manner as shown in FIG. 1C. Hinge 44 that is formed by cover 40 desirably has an extra length so that a portion of cover 40 can extend into the area between bodies 20 and 30 so that, as noted, tabs 20AAA and 30AAA can fit into the same when the foreign material exclusion device is in an open position as shown in FIG. 1C. While only two bodies 20 and 30 are shown, as well as only one flexible cover 40 containing two pockets therein, it is to be understood that greater than two bodies can exist as well as two more flexible covers 40 each having one or more pockets therein.

As shown in the drawings, each body 20 and 30 has at least one handle 50 attached thereto to aid in pulling and folding the foreign material exclusion device out of a tube, pipe or cavity upon completion of an assembly of any apparatus so that the tube, pipe or cavity is open to the flow of a fluid therethrough wherein no debris or foreign matter exists. While the handles can be located on generally any portion on the surface of the bodies, preferably, as opposed to the periphery thereof, they are located near hinge 44. Thus, when device 10 is located in a tube or pipe in an open position as shown in FIG. 1C, the handles are adjacent to one another and can be readily grabbed and pulled out of the tube along with the rest of the device. The means of handle attachment can generally be any known to the art such as through the use of adhesives, for example, an epoxy, mechanical fasteners such as a screw or staple, and the like, but preferably are sewed to the flexible cover 40.

Suitable materials for use in forming one or more flexible cover layers, in whole or in part, of the enclosure include, but are not limited to, natural fibers, for example including but not limited to cotton, jute, hemp, and flax; wool; aramid-type polymers, polyhydroquinone-diimidazopyridine; and coated nylons or combinations thereof. Suitable heat resistant and fire-resistant materials are known in the art and available as Arselon®, Kevlar®, ModacrylicS, M5® fiber, Nomex® I, II and/or III, PBI® and Pyrovatex®. Preferably, flexible cover 40 or at least one layer of a laminate forming the same is Nomex® III that is generally a blend of Nomex®, Kevlar®, and one or more anti-static fibers.

An important aspect of the present invention, as noted above, is that inasmuch as the fabric or cloth is applied to the flexible, stretchable, and compressible, resilient body 20 or 30, it does not impede such stretching or compression. Thus, the fabric or cloth is generally larger than the body to which it is to be applied and only attached intermittently at portions along the perimeter of the flexible body in any conventional manner known to the art and to the literature. For example, an oversized fabric or cloth can be affixed or secured to body 20 or 30 as by sewing thereto, through the use of an adhesive, industrial tape, or the like. Thus, upon insertion of exclusion device 10 into a tube or pipe, it is compressed and the fabric or cloth loosely covers the same. Upon insertion into the tube or pipe, and release of the compression, the bodies 20 and 30 expand to form a snug fit within the pipe or tube having flexible cover 40 thereon and also contains hinge 44 to accommodate the opening and closing of the exclusion device as well as maintain the plurality such as two or more bodies together.

In accordance with the patent statutes, the best mode and preferred embodiment have been set forth; the scope of the invention is not limited thereto, but rather by the scope of the attached claims.

What is claimed is:

1. A flexible, foldable foreign material exclusion device, comprising:
a first body comprising a resilient material, wherein the first body has a first planar surface, a second planar surface and a first sidewall therebetween, wherein the first body is compressible and re-expandable in a direction parallel to at least one of the first planar surface and the second planar surface;
a second body comprising a resilient material wherein the second body has a first planar surface, a second planar surface and a second sidewall therebetween, wherein the second body is compressible and re-expandable in a direction parallel to at least one of the first planar surface and the second planar surface;
a cover comprising first pouch that encloses the first body, a second pouch that encloses the second body, and a hinge connecting the first pouch to the second pouch, wherein the hinge is a joint that allows the first pouch to be rotated in relation to the second pouch between a closed position and an open position wherein the first planar surface of the first body is parallel to the first planar surface of the second body;
a first handle having i) a first end connected to the first pouch at an area of the cover located where the first body first planar surface meets the first body sidewall beneath the cover and ii) a second end connected to the first pouch at an area of the cover located where the first body first planar surface meets the first body sidewall beneath the cover on an opposite side of the first planar surface as compared to the first handle first end; and
a second handle having i) a first end connected to the second pouch at an area of the cover located where the second body first planar surface meets the second body sidewall beneath the cover and ii) a second end connected to the second pouch at an area of the cover located where the second body first planar surface meets the second body sidewall beneath the cover on an opposite side of the first planar surface as compared to the second handle first end.

2. The device according to claim 1, wherein the first body first sidewall has a first hinge sidewall that abuts a second hinge sidewall of the second body second sidewall in the open position.

3. The device according to claim 2, wherein the first hinge sidewall and the second hinge sidewall are co-planar in the closed position.

4. The device according to claim 2, wherein the first body and the second body are each semicylindrical in shape.

5. The device according to claim 4, wherein the first body and second body form a disk in the open position.

6. The device according to claim 2, wherein the hinge is located adjacent to i) a junction between the first hinge sidewall and first body second planar surface and ii) a junction between the second hinge sidewall and the second body second planar surface.

7. The device according to claim 1, wherein the first pouch conforms to the shape of the first body and the second pouch conforms to the shape of the second body.

8. The device according to claim 1, wherein the cover comprises a woven fabric that is flame retardant, wherein the first body and second body comprise one or more of a polymer, rubber, elastomer, polymer foam, foamed rubber, and foamed elastomer.

9. A flexible, foldable foreign material exclusion device, comprising:
a foldable cylindrical plug including a first body hingedly connected to a second body such that in an open position the plug forms a cylinder and in a non-open position does not form the cylinder,
wherein the hinge allows the first body to be rotated in relation to the second body,
wherein the first body and the second body each comprise a resilient material that is compressible and recompressible in a direction perpendicular to a height of the cylinder;
wherein a handle is connected to the plug that can be used to manipulate the plug between the open position and the non-open position, and
further including a cover comprising a first pouch that encloses the first body, and a second pouch that encloses the second body, wherein the cover includes the hinge as an integral part of the cover, and wherein the hinge is formed by the cover which has a portion that extends into the area between the first body and the second body,
wherein the first pouch is closed by a first flange that extends the length of the first hinge sidewall, wherein the first flange has a first tab at a free end thereof that coextends the length of the first flange, and wherein the first tab is tucked into the pouch and is in contact with the hinge; and
wherein the second pouch is closed by a second flange that extends the length of the second hinge sidewall, wherein the second flange has a second tab at a free end thereof that coextends the length of the second flange, and wherein the second tab is tucked into the pouch and is in contact with the hinge.

10. The device according to claim 9, wherein the first body and the second body are each semi-cylindrical.

11. The device according to claim 10, wherein the first body has a first planar surface, a second planar surface and a first sidewall therebetween, wherein the second body has a first planar surface, a second planar surface and a second sidewall therebetween.

12. The device according to claim 11, wherein the cover comprises a woven fabric that is flame retardant, wherein the first body and second body comprise one or more of a polymer, rubber, elastomer, polymer foam, foamed rubber, and foamed elastomer.

13. The device according to claim 10, wherein the first body has a first planar surface, a second planar surface and a first sidewall therebetween including a first hinge sidewall, wherein the second body has a first planar surface, a second planar surface and a second sidewall therebetween that includes a second hinge sidewall, wherein the first hinge sidewall abuts the second hinge sidewall in the open position.

14. The device according to claim 13, wherein the hinge is located adjacent to i) a junction between the first hinge sidewall and first body second planar surface and ii) a junction between the second hinge sidewall and the second body second planar surface.

15. The device according to claim 14, wherein two handles are present, with the first handle having it a first end connected to the first pouch at an area of the cover located where the first body first planar surface meets the first body sidewall beneath the cover and ii) a second end connected to the first pouch at an area of the cover located where the first body first planar surface meets the first body sidewall beneath the cover on an opposite side of the first planar surface as compared to the first handle first end; and
  a second handle having i) a first end connected to the second pouch at an area of the cover located where the second body first planar surface meets the second body sidewall beneath the cover and ii) a second end connected to the second pouch at an area of the cover located where the second body first planar surface meets the second body sidewall beneath the cover on an opposite side of the first planar surface as compared to the second handle first end.

16. A flexible, foldable foreign material exclusion device, comprising:
  a first body comprising a resilient material, wherein the first body has a first planar surface, a second planar surface and a first sidewall therebetween, wherein the first body is compressible and re-expandable in a direction parallel to at least one of the first planar surface and the second planar surface;
  a second body comprising a resilient material wherein the second body has a first planar surface, a second planar surface and a second sidewall therebetween, wherein the second body is compressible and re-expandable in a direction parallel to at least one of the first planar surface and the second planar surface;
  a cover comprising first pouch that encloses the first body, a second pouch that encloses the second body, and a hinge connecting the first pouch to the second pouch, wherein the hinge is a joint that allows the first pouch to be rotated in relation to the second pouch between a closed position and an open position wherein the first planar surface of the first body is parallel to the first planar surface of the second body;
  a handle connected to one or more of the first pouch and the second pouch that can be used to manipulate the device;
  wherein the first pouch is closed by a first flange that extends the length of the first hinge sidewall, wherein the first flange has a first tab at a free end thereof that coextends the length of the first flange, and wherein the first tab is tucked into the pouch and is in contact with the hinge; and
  wherein the second pouch is closed by a second flange that extends the length of the second hinge sidewall, wherein the second flange has a second tab at a free end thereof that coextends the length of the second flange, and wherein the second tab is tucked into the pouch and is in contact with the hinge.

* * * * *